United States Patent
Murakawa et al.

(10) Patent No.: US 8,696,134 B2
(45) Date of Patent: Apr. 15, 2014

(54) DEPOLARIZATION ELEMENT AND PROJECTION TYPE DISPLAY DEVICE

(75) Inventors: Masahiro Murakawa, Fukushima (JP); Atsushi Koyanagi, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 106 days.

(21) Appl. No.: 13/415,162

(22) Filed: Mar. 8, 2012

(65) Prior Publication Data

US 2012/0236263 A1    Sep. 20, 2012

(30) Foreign Application Priority Data

Mar. 15, 2011    (JP) ................................. 2011-056209

(51) Int. Cl.
*G02B 5/30*    (2006.01)
*G03B 21/14*    (2006.01)

(52) U.S. Cl.
USPC ....................................... 353/20; 359/494.01

(58) Field of Classification Search
USPC ............. 353/20; 359/486.01, 485.01, 486.02, 359/486.03, 487.05, 487.04, 494.01, 359/489.15, 489.16
See application file for complete search history.

(56) References Cited

U.S. PATENT DOCUMENTS

| | | | |
|---|---|---|---|
| 5,313,479 A | 5/1994 | Florence | |
| 7,484,340 B2 | 2/2009 | Ishihara et al. | |
| 8,111,458 B2 * | 2/2012 | Murooka et al. | 359/486.01 |
| 2008/0049321 A1 * | 2/2008 | McEldowney et al. | 359/494 |
| 2009/0257028 A1 | 10/2009 | Osawa et al. | |
| 2012/0062848 A1 * | 3/2012 | Koyanagi et al. | 353/20 |
| 2012/0268818 A1 * | 10/2012 | Liu et al. | 359/494.01 |

FOREIGN PATENT DOCUMENTS

| | | | |
|---|---|---|---|
| JP | 6-208089 | * | 7/1994 |
| JP | 2003-521740 T | | 7/2003 |
| JP | 2004-341453 A | | 12/2004 |
| JP | 2005-148119 A | | 6/2005 |
| JP | 2006-003479 A | | 1/2006 |
| JP | 2006-47421 | * | 2/2006 |
| JP | 2008-226405 A | | 9/2008 |
| JP | 2009-151221 A | | 7/2009 |
| WO | WO 2007/105767 A | | 9/2007 |
| WO | WO2008/047800 | * | 4/2008 |
| WO | WO 2010/116727 A1 | | 10/2010 |

OTHER PUBLICATIONS

U.S. Appl. No. 13/227,793, filed Sep. 8, 2011, Atsushi Koyanagi, et al.

* cited by examiner

*Primary Examiner* — William C Dowling

(74) *Attorney, Agent, or Firm* — Oblon, Spivak, McClelland, Maier & Neustadt, L.L.P.

(57) ABSTRACT

A depolarization element includes high depolarization for light beams having coherence and plural wavelengths and also provides a projection type display device capable of reducing speckle noise. Unit regions, each formed of m regions ($m \geq 4$) having different phase differences generated for incident light, are disposed, and two regions extracted from the m regions have at least one combination of regions being different in area. When plural light beams having different wavelengths are incident, the composition of the Stokes vectors of the light beams emitted from the respective m regions is made nearly zero by setting the areas of the respective m regions and the generated phase differences, whereby the light beams having coherence and plural wavelengths can be converted so as to have the polarization state of natural light.

10 Claims, 11 Drawing Sheets

DEPOLARIZATION ELEMENT AND PROJECTION TYPE DISPLAY DEVICE

BACKGROUND

1. Field of the Invention

The present invention relates to a depolarization element and a projection type display device, and more particularly, to a depolarization element on which light having coherence is incident and a projection type display device in which a light source having coherence is used.

2. Description of the Related Art

In a projection type display device for displaying projection images on a screen, such as a data projector or a rear projection type television receiver, an ultra-high pressure mercury (UHP) lamp has been used conventionally as a light source. However, a laser has been proposed as a light source from the viewpoint of superiority in monochromaticity and long service life.

In addition, since the wavelength band in the vicinity of 645 nm, i.e., the wavelength of red, has a broad spectrum because of the nature of the UHP lamp, a combination light source in which a laser is used as a red light source and a UHP lamp is used for blue and green wavelength bands has also been proposed. However, such a projection type display device in which a laser is used as a light source has a problem that granular speckle noise due to the coherence of laser light occurs in projection images and degrades the quality of the projection images.

Hence, a projection type display device, in which a phase modulation element formed of liquid crystal or polymer liquid crystal is disposed as means for removing speckle noise in an optical path from a laser light source, is disclosed by WO/2008/047800.

Furthermore, an example of this phase modulation element is given in which one or both of the orientation direction of a slow axis and a retardation value are distributed while having different values from each other inside a plane perpendicular to the optical axis of the laser light, and the orientation direction of the slow axis is distributed in a radial direction or a circumferential direction around the optical axis over the entire plane on which the laser light is incident.

However, in the phase modulation element according to WO/2008/047800, the orientation direction of the slow axis and the retardation value are distributed so as to change totally smoothly on the plane perpendicular to the optical axis of the incident laser light. Hence, with respect to the distribution in some narrow regions in the regions of the phase modulation element on which the light is incident, the changes in the orientation direction of the slow axis and the retardation value are small, whereby there occurs a problem that it is difficult to obtain depolarization in uniform distribution and it is difficult to reduce speckle noise partially and significantly in the projection type display device. Furthermore, in the case that a setting is done to obtain high depolarization for a light beam having a specific wavelength among light beams incident on the phase modulation element, depolarization equivalent thereto cannot be obtained for a light beam having a wavelength different from the specific wavelength. Hence, there is a problem that depolarization has wavelength dependence.

SUMMARY

The present invention has been made to solve the above-mentioned problems occurring in the prior art, and an object of the present invention is to provide a depolarization element capable of obtaining high depolarization for plural light beams having coherence and different wavelengths. In addition, another object of the present invention is to provide a highly reliable projection type display device capable of reducing speckle noise stably and significantly in the case that a light source for emitting plural light beams having coherence and different wavelengths is used.

In view of the points described above, the present invention provides a depolarization element, including: birefringence material layers including birefringence materials; and unit regions, each formed of m regions (m≥4) having different phase differences generated for incident linearly-polarized light, wherein: two regions, extracted from the m regions, has at least one combination of regions being different in area; a polarization state of the light that includes two or more light beams being different is changed; and when the area of the unit region is 1, i is an integer of 1 to m, the area of the i-th region is Ai, the phase difference generated for the light incident on the i-th region is $\delta i$, the angle between the polarization direction of the incident linearly-polarized light and the optic axis of the birefringence material is $\theta$, the following expressions are satisfied.

[Mathematical expression 1]

$$\left| \sum_{i=1}^{m} Ai \left( 1 - 2\sin^2 \frac{\delta i}{2} \sin^2 2\theta \right) \right| \leq 0.0707 \quad (9a)$$

$$\left| \sum_{i=1}^{m} Ai \sin^2 \frac{\delta i}{2} \sin 4\theta \right| \leq 0.0707 \quad (9b)$$

$$\left| \sum_{i=1}^{m} Ai \sin \delta i \sin^2 2\theta \right| \leq 0.0707 \quad (9c)$$

In addition, the present invention provides the depolarization element, wherein the unit region has m regions, $4 \leq m \leq 8$.

Furthermore, the present invention provides the depolarization element, wherein the light includes a light beam having a wavelength of 440 nm and a light beam having a wavelength of 650 nm.

Moreover, the present invention provides the depolarization element, wherein the light includes a light beam having a wavelength of 532 nm.

Besides, the present invention provides the depolarization element, wherein the light includes a light beam having a band of 440 to 650 nm.

What is more, the present invention provides the depolarization element, wherein the optic axes of the birefringence materials are aligned in the same direction and the thicknesses of the birefringence material layers of the m regions are different from each other (a layer having a thickness of zero is included).

Additionally, the present invention provides the depolarization element, wherein the thicknesses of the m regions are different from each other while having a nearly equal level difference.

Further, the present invention provides the depolarization element, wherein the angle between the polarization direction of the linearly-polarized light and the optic axis direction of the birefringence material is approximately 45° and the following expressions are satisfied.

[Mathematical expression 2]

$$\left|\sum_{i=1}^{m} Ai\cos\delta i\right| \leq 0.1 \quad (17a)$$

$$\left|\sum_{i=1}^{m} Ai\sin\delta i\right| \leq 0.1 \quad (17b)$$

Also, the present invention provides a projection type display device equipped with a light source section having at least one light source emitting coherent light, an image light generating section for generating image light by modulating the light emitted from the light source section, and a projection section for projecting the image light, wherein the above-mentioned depolarization element is disposed in the optical path of the light emitted from the light source section.

Still further, the present invention provides the above-mentioned projection type display device further equipped with a rocking control section for oscillating the disposed depolarization element.

The present invention can realize a depolarization element capable of obtaining uniformly high depolarization for plural light beams having coherence and different wavelengths. In addition, the present invention has an effect capable of reducing speckle noise generated on the entire area of a projection image stably and significantly in a projection type display device employing a light source for emitting plural light beams having coherence and different wavelengths.

BRIEF DESCRIPTION OF THE DRAWINGS

The present invention will become more fully understood from the detailed description given hereinbelow and the accompanying drawing which is given by way of illustration only, and thus is not imitative of the present invention and wherein.

DETAILED DESCRIPTION OF THE INVENTION (Depolarization Element According to First Embodiment)

Figure 1:
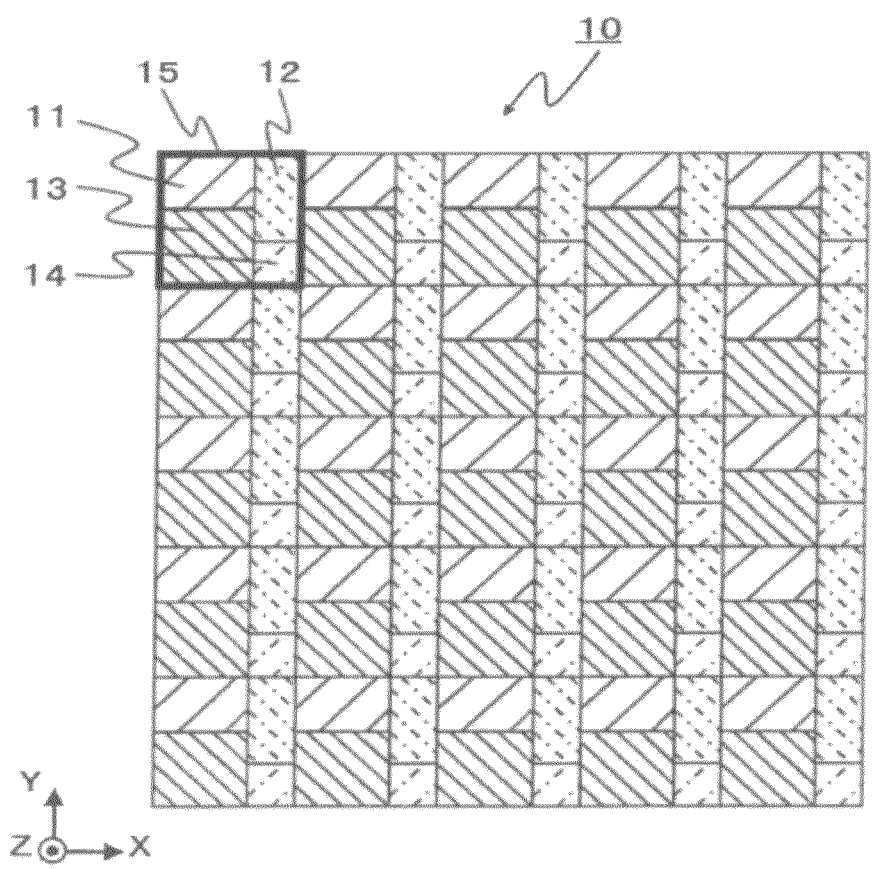
FIG. 1 is a schematic plan view (1) showing a depolarization element.
Figure 2A:
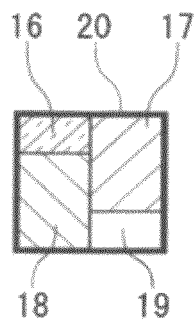
FIGS. 2A to 2H are layout views (1) showing the unit regions of the depolarization element.
Figure 2B:
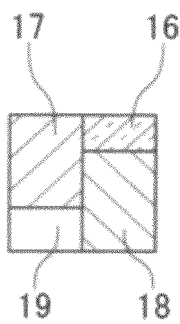
Figure 2C:
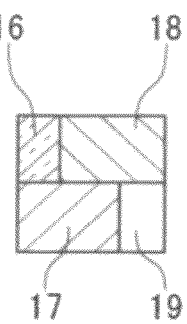
Figure 2D:
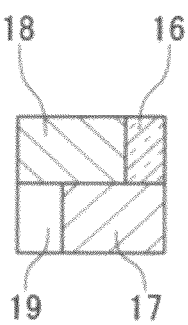
Figure 2E:
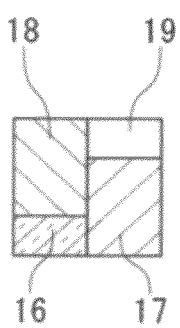
Figure 2F:
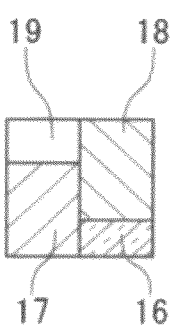
Figure 2G:
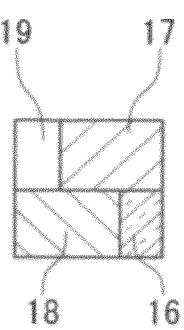
Figure 2H:
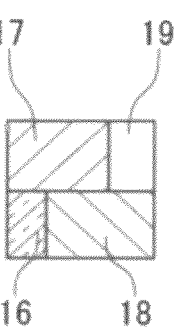

FIG. 1 is a schematic plan view showing a depolarization element 10 according to a first embodiment of the present invention. The depolarization element 10 has one unit region 15 consisting of a first region 11, a second region 12, a third region 13 and a fourth region 14, the phase differences of these regions, generated when the light having the same wavelength is incident, being different from one another, or the depolarization element 10 has a region in which plural the unit regions 15 are disposed so as to be arranged two-dimensionally. In the case that the plural unit areas 15 having the same layout are disposed so as to be arranged as shown in the figure, it is preferable that three to 50 unit regions should be included inside the irradiation area of light (laser light) incident on the depolarization element 10. This is based on the fact that if the number of the unit regions is less than three, the effect of depolarization cannot be delivered sufficiently and that if the number of the unit regions is more than 50, diffracted light beams generated by the unit regions 15 arranged periodically and repeatedly become stray light beams, loss in the amount of light occurs, and high utilization efficiency of the light is not obtained.

In addition, it is preferable to use a configuration in which the areas of the four regions constituting the unit region 15 are not identical. "Not identical" herein means that when two regions included in the unit region are extracted, the number of combinations of the regions having different areas is at least one. Hence, a case in which two regions having the same area are extracted may be included depending on the combination.

Next, FIGS. 2A to 2H show layout examples in which a first region 16, a second region 17, a third region 18 and a fourth regions 19 constituting a unit region 20 are arranged. The depolarization element 10 may have a configuration in which one unit region having a layout selected from these eight kinds of layouts is used and plural the unit regions are arranged.

Figure 3:
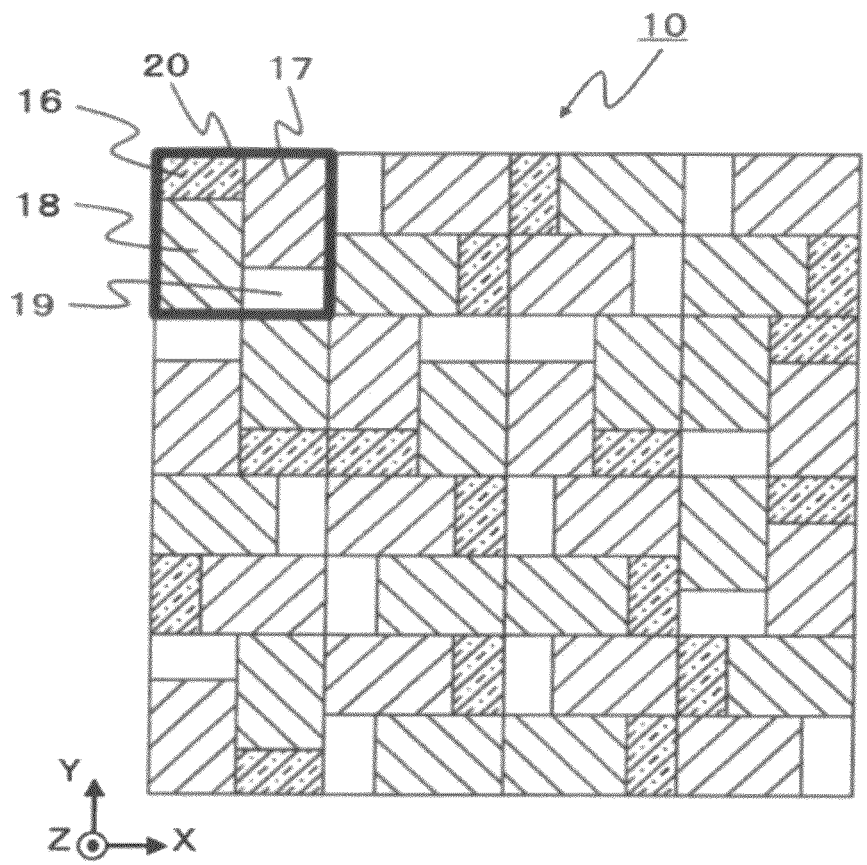
FIG. 3 is a schematic plan view (2) showing the depolarization element.

FIG. 3 is a schematic plan view showing an example of another configuration of the depolarization element 10 in which the unit regions 20 having eight kinds of layouts are disposed so as to be arranged at random two-dimensionally. In the case that the depolarization element 10 has this kind of arrangement, there is no periodicity in the disposition of the unit regions 20. For this reason, in this case, the number of the unit regions 20 disposed and arranged so as to constitute the depolarization element 10 may be more than 50 inside the irradiation area of the light (laser light) incident on the depolarization element 10.

Figure 4:
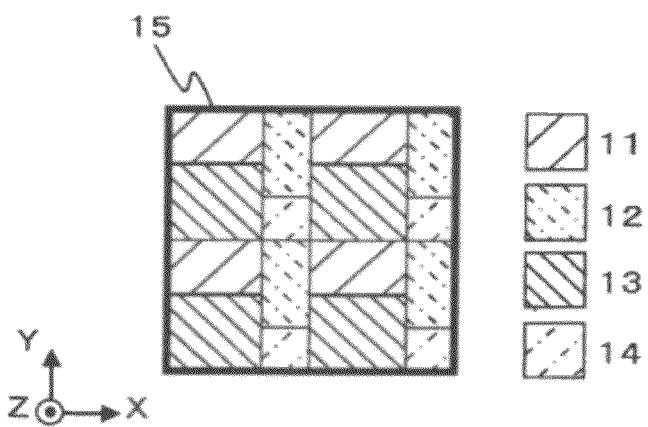
FIG. 4 is a layout view (2) showing the unit region of the depolarization element.

Furthermore, for example, the first regions 11 may be disposed separately in plural regions inside the unit region 15, provided that the first regions emit light having the same polarization state. In other words, in this case, the layout of each region can be set as desired, provided that the area of each region inside the unit region 15 has a specific ratio. FIG. 4 is a schematic plan view showing an example in which the first regions 11, the second regions 12, the third regions 13 and the fourth regions 14, four each, are disposed separately inside the unit region 15. In other words, as in the example shown in FIG. 4, the unit region 15 may have a configuration formed of the arrangement of plural separate unit regions (in this case, 2×2). In this case, the number of the plural unit regions 15 disposed so as to be arranged in the depolarization element 10 may be less than three inside the irradiation area of the light (laser light) incident on the depolarization element 10.

Furthermore, although the unit region 15 of the depolarization element 10 is described so as to have a square shape, the unit region may have rectangular, parallelogram or trapezoidal shapes or other polygonal or curved shapes, for example.

Moreover, as described above, in the depolarization element 10, phase differences generated when the light having the same wavelength is incident are different in the respective regions. In other words, the polarization states of the light passing through the first regions 11 are the same, the polarization states of the light passing through the second regions 12 are the same, the polarization states of the light passing through the third regions 13 are the same, and the polarization states of the light passing through the fourth regions 14 are the same. However, the polarization states of the light passing through these regions are different from one another. An example in which the unit region 15 is formed of four regions is described herein. However, without being limited to this, the unit region should only be formed of four or more regions. Still further, the upper limit number of the regions to be divided is not limited particularly, but it is preferable that the number should be eight or less because the configuration of the depolarization element 10 does not become complicated.

Next, the polarization states of the light passing through the first regions 11, the polarization states of the light passing through the second regions 12, the polarization states of the light passing through the third regions 13, and the polarization states of the light passing through the fourth regions 14 are examined using Stokes parameters S. First, the Stokes parameters S are usually represented by four-dimensional vectors ($S_0$, $S_1$, $S_2$, $S_3$). Furthermore, the traveling direction of the light is a Z-axis direction, an X-Y plane perpendicular to the Z-axis direction is provided, $S_0$ is the intensity of the light, $S_1$ is the intensity of an electric field oscillating in the 0° direction with reference to the X-axis direction, for example, $S_2$ is the intensity of an electric field oscillating in the 45° direction with reference to the X-axis direction, and $S_3$ is the intensity of circularly-polarized light. In this case, a value proportional to the area of each region is given as the intensity $S_0$ of the light.

Figure 5:
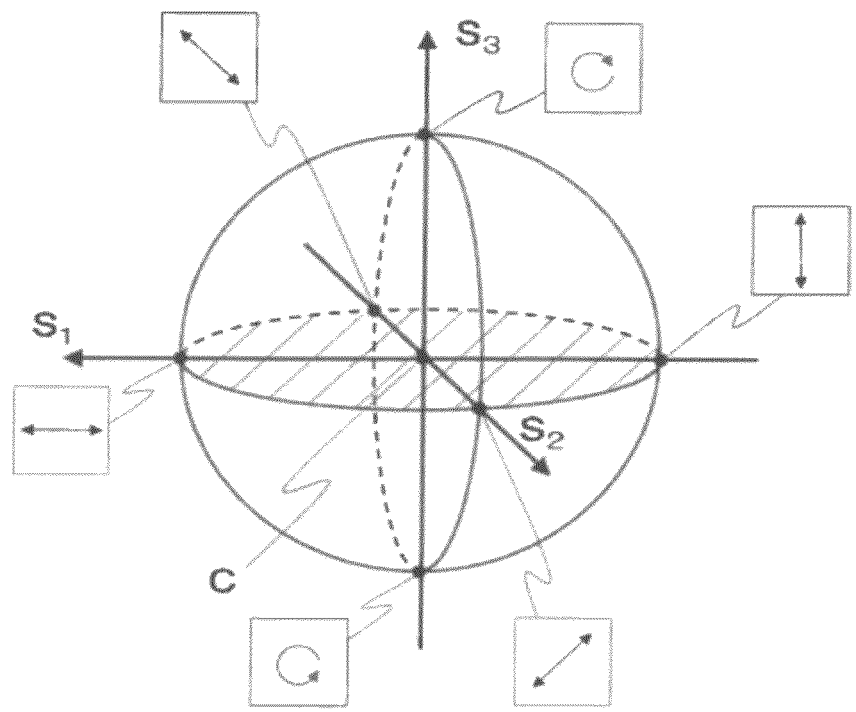
FIG. 5 shows a Poincare sphere representing polarization states of respective positions.

FIG. 5 shows a Poincare sphere representing polarization states using $S_1$, $S_2$ and $S_3$ of the Stokes parameters S, and the relationship among the polarization states of the light passing through the respective regions is examined using this Poincare sphere. Vectors directed to the positions of the respective Stokes parameters are referred to as Stokes vectors while the center point C of the Poincare sphere is used as a reference. In other words, the Stokes parameters can be represented by ($S_1$, $S_2$, $S_3$). Then, in consideration of the relationship among the Stokes vector of the light passing through the first regions 11, the Stokes vector of the light passing through the second regions 12, the Stokes vector of the light passing through the third regions 13 and the Stokes vector of the light passing through the fourth regions 14, if the composition of these vectors becomes nearly zero, the state of natural light is obtained in which polarization is eliminated significantly. The depolarization element 10 according to this embodiment is designed for light beams having at least two different wavelengths so that the composition of the Stokes vectors of the light beams in the respective regions, emitted from the unit region 15, becomes nearly zero.

Figure 6:
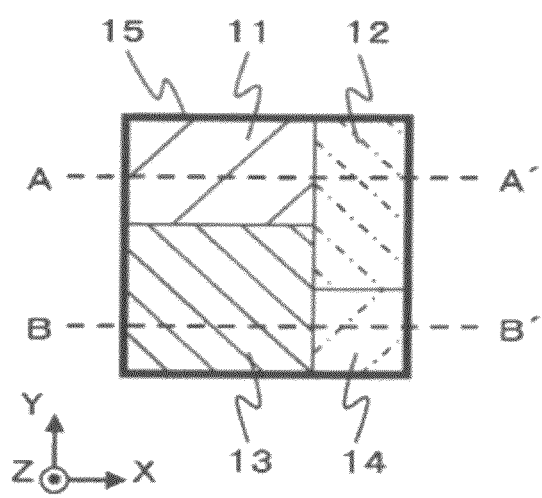
FIG. 6 is a schematic plan view showing the unit region.
Figure 7A:
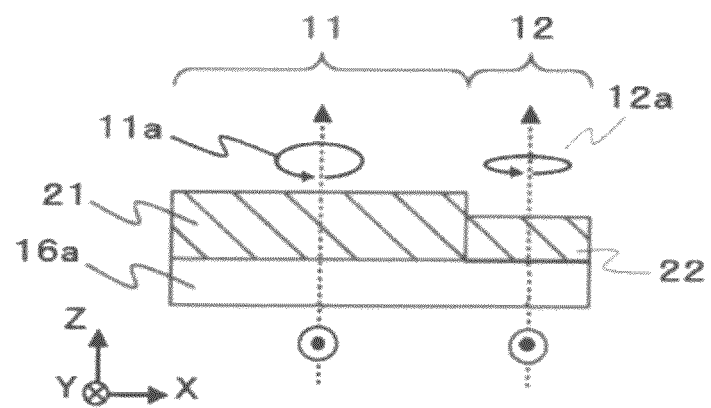
FIG. 7A is example 1 of a cross-sectional view of the unit region.
Figure 7B:
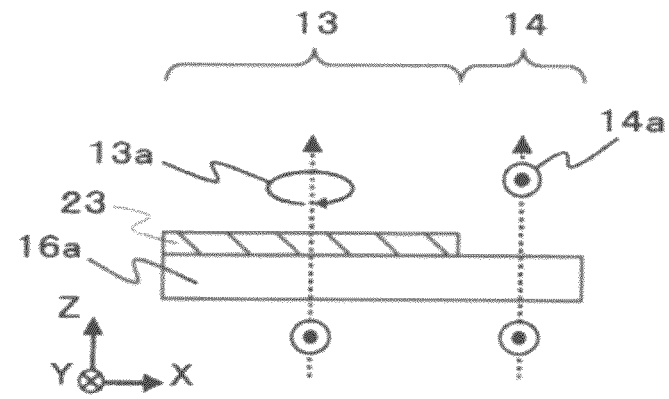
FIG. 7B is example 2 of a cross-sectional view of the unit region.

Next, a specific configuration of the unit region 15 shown in FIG. 1 will be described below. First, FIG. 6 shows the unit region 15 shown in FIG. 1, and a straight line A-A' included in the first region 11 and the second region 12 and a straight line B-B' included in the third region 13 and the fourth region 14 are shown and used when the cross-sectional shapes of the regions are described later. Furthermore, FIG. 7A is an example of a cross-sectional view taken along the straight line A-A', and FIG. 7B is an example of a cross-sectional view taken along the straight line B-B'. The depolarization element 10 has birefringence material layers 21, 22 and 23 made of birefringence materials on a transparent substrate 16a. In addition, FIGS. 7A and 7B also schematically show the polarization states of the light beams emitted from the respective regions when linearly-polarized light is incident on the unit region 15 in the Y direction, more specifically, show the polarization states of the respective light beams emitted from the first region 11 to the fourth region 14 as 11a, 12a, 13a and 14a. At this time, the areas of the respective regions and the polarization states, i.e., the thicknesses of the birefringence material layers should be adjusted so that the composition of the Stokes vectors of the light beams emitted from the unit region 15 becomes nearly zero.

The transparent substrate 16a can be made of various materials, such as a resin plate and a resin film, provided that the materials are transparent to incident light. However, it is preferable to use optically isotropic materials, such as glass and quartz glass, because such materials do not exert the influence of birefringence on transmitted light. Furthermore, it is preferable to provide an antireflection film formed of a multilayer film on the interface to air because the film can reduce optical reflection loss due to Fresnel reflection.

As a birefringence material, it is possible to use a polymer liquid crystal obtained when a liquid crystal monomer having birefringence is aligned in one direction or twist-aligned and then polymerized and solidified. Furthermore, for example, in FIGS. 7A and 7B, an alignment film, not shown, may be provided between the transparent substrate 16a and the birefringence material layers 21, 22 and 23. It is possible to use an alignment film subjected to rubbing treatment; an optically alignment film, the alignment direction of which can be controlled using light such as ultraviolet light; an alignment film on which $SiO_2$ or the like is obliquely deposited; an alignment film, the alignment direction of which can be controlled using a minute groove structure; etc.

Furthermore, as the birefringence material layer, materials other than the above-mentioned materials can be used, for example, birefringence crystals, such as quarts and $LiNbO_3$; birefringence films obtained by stretching organic films, such as polycarbonate; photonic crystals obtained by laminating optical multilayer films on structural birefringence generated by a minute concave-convex lattice shape or on the concave-convex lattice shape; etc. In the case that the structural birefringence, photonic crystals, etc. are used, the optic axis corresponds to the longitudinal direction of the minute concave-convex lattice shape and to the direction perpendicular to the longitudinal direction.

Next, the specific configurations of the birefringence material layers 21, 22 and 23 will be described below. First, it is assumed that the traveling direction of the linearly-polarized light incident on the depolarization element 10 is a Z direction, and that the face of the transparent substrate 16a is an X-Y plane. Furthermore, it is assumed that the polarization direction of the linearly-polarized light is a Y direction. At this time, the directions of the optic axes of the birefringence materials constituting the birefringence material layers 21, 22 and 23 are 45° from the Y direction on the X-Y plane and are uniformly aligned in the thickness direction. It is preferable to set the optic axes of the birefringence material layers to 45° or −45° from the Y direction, that is, 45° or −45° from the polarization direction of the incident linearly-polarized light because the design can be simplified due to the reasons described later. However, the setting is not limited to the above-mentioned setting. The optic axis is defined as a slow axis or a fast axis. The ordinary light refractive index of a birefringence material is designated as $n_o$, the extraordinary light refractive index is designated as $n_e$, and $|n_e-n_o|$ is defined as refractive index anisotropy $\Delta n$. In particular, the refractive index anisotropy depending on a wavelength $\lambda$ is represented by $\Delta n(\lambda)$. Still further, in FIG. 7B, a configuration is used in which the thickness of the birefringence material layer in the fourth region 14 is zero, that is, no birefringence material layer is provided. However, without being limited to this configuration, a birefringence material layer, not shown, may be provided.

In the embodiments relating to the depolarization elements described later, the above-mentioned materials can be used similarly for transparent substrates and birefringence materials, unless otherwise specified.

Figure 8A:
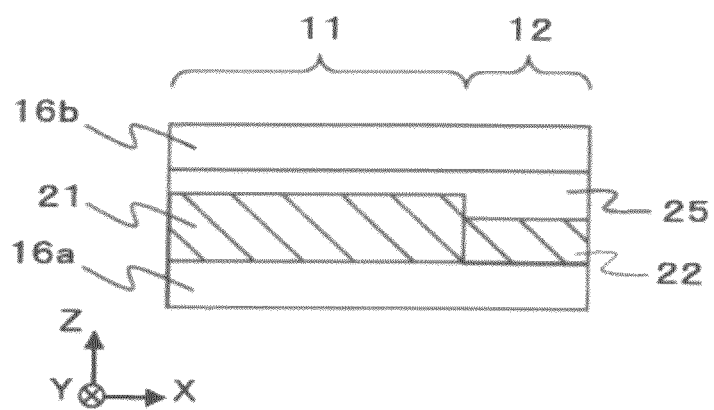
FIG. 8A is example 3 of a cross-sectional view of the unit region.
Figure 8B:
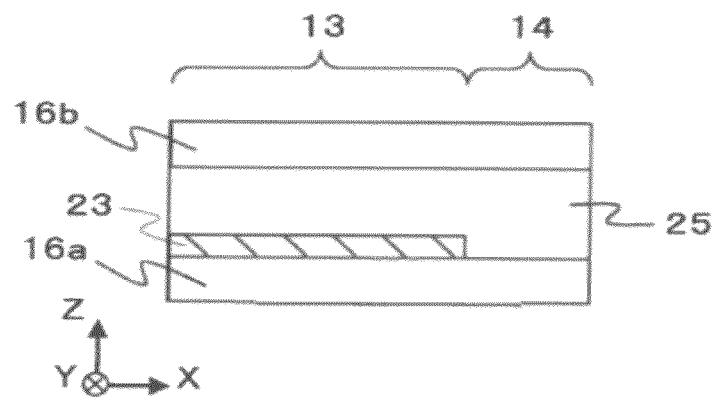
FIG. 8B is example 4 of a cross-sectional view of the unit region.
Figure 9A:
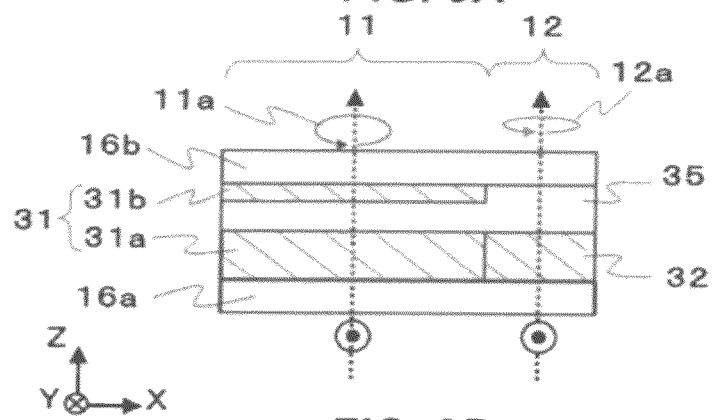
FIG. 9A is example 5 of a cross-sectional view of the unit region.
Figure 9B:
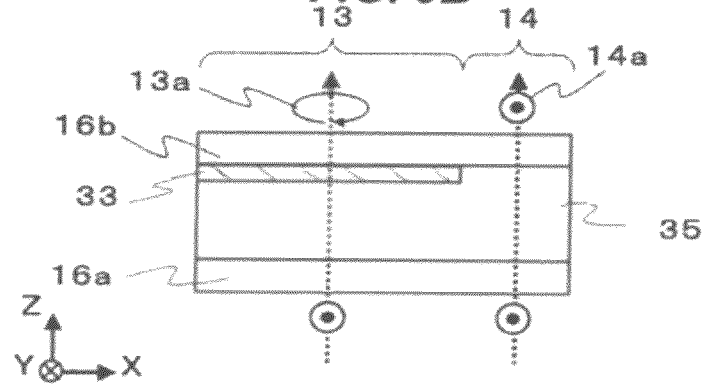
FIG. 9B is example 6 of a cross-sectional view of the unit region.

In addition, the configuration of the depolarization element 10 is not limited to the configuration shown in FIGS. 7A and 7B, but may be other examples shown in the schematic cross-sectional views taken along the straight lines A-A' and B-B' in FIG. 6 showing the unit region 15; the other examples are, respectively, a configuration shown in FIGS. 8A and 8B and a configuration shown in FIGS. 9A and 9B. First, FIGS. 8A and 8B show a configuration in which a filling material layer 25 made of an isotropic transparent material that is provided to fill concave-convex portions formed by the birefringence material layers of the respective regions being different in thickness, and a transparent substrate 16b is opposed to the transparent substrate 16a so as to be integrated.

Furthermore, in the configuration shown in FIGS. 9A and 9B, the birefringence material layer 32 of the second region 12 is provided on the transparent substrate 16a, and the birefringence material layer 33 of the third region 13 is provided on the transparent substrate 16b. Furthermore, as the birefringence material layer 31 of the first region 11, a birefringence material layer 31a as thick as the birefringence material layer 32 on the transparent substrate 16a and a birefringence material layer 31b as thick as the birefringence material layer 33 on the transparent substrate 16b are combined and integrated into a single layer, while concave-convex portions formed by the birefringence material layers 31, 32 and 33 are filled with a filling material layer 35 so as to be flattened, whereby an integrated configuration is obtained.

Next, a phenomenon in which the linearly-polarized light incident on the depolarization element 10 passes through the depolarization element 10 and polarization is eliminated will be described below specifically using Stokes parameters. Since the depolarization of the depolarization element 10 is assumed to be the superimposition (or average) of the results of depolarization in respective unit regions, depolarization in the unit region 15 will be examined below. The linearly-polarized light incident on the unit region 15 is linearly-polarized light in the X direction, and when the light is assumed to be (I_input), the light can be represented using Stokes parameters as Expression (1). Expression (1) corresponds to the four-dimensional vectors of the above-mentioned Stokes parameters ($S_0$, $S_1$, $S_2$, $S_3$), represented in a different way.

[Mathematical expression 3]

$$\text{I\_input} = \begin{pmatrix} 1 \\ 1 \\ 0 \\ 0 \end{pmatrix} \quad (1)$$

wherein the unit region 15 is divided into m regions; in the case that i is an integer of any of 1 to m, a phase difference generated in the i-th region is $\delta i$; when the fast axis of a birefringence material layer is directed in a direction making an angle of $\theta$ from the X direction in the X-Y plane, a matrix for calculating the Stokes parameters can be represented as Expression (2). The phase difference corresponds to the phase difference between the slow axis component and the fast axis component of the light passing through the birefringence material layer.

[Mathematical expression 4]

$$WPi(\delta i, \theta) = \begin{pmatrix} 1 & 0 & 0 & 0 \\ 0 & 1-2\sin^2\frac{\delta i}{2}\sin^2 2\theta & \sin^2\frac{\delta i}{2}\sin 4\theta & -\sin\delta i\sin 2\theta \\ 0 & \sin^2\frac{\delta i}{2}\sin 4\theta & 1-2\sin^2\frac{\delta i}{2}\cos^2 2\theta & \sin\delta i\cos 2\theta \\ 0 & \sin\delta i\sin 2\theta & -\sin\delta i\cos 2\theta & \cos\delta i \end{pmatrix} \quad (2)$$

Next, when it is assumed that the area of the unit region is A and the area of the i-th region is Ai, the area A can be represented by Expression (3). When standardization of A=1 is performed in Expression (3), the linearly-polarized light (Ii_input) incident on the i-th region can be represented as Expression (4).

[Mathematical expression 5]

$$A = \sum_{i=1}^{m} Ai \quad (3)$$

[Mathematical expression 6]

$$\text{Ii\_input} = \begin{pmatrix} Ai \\ Ai \\ 0 \\ 0 \end{pmatrix} \quad (4)$$

As a result, the polarization state of the light (Ii_output) emitted from the i-th region can be represented as Expression (5). For example, the stokes vector $S_0$ of the light emitted from the i-th region is herein represented as $S_0(i)$.

[Mathematical expression 7]

$$\text{Ii\_output} = \begin{pmatrix} S_0(i) \\ S_1(i) \\ S_2(i) \\ S_3(i) \end{pmatrix} = \begin{pmatrix} Ai \\ Ai\left(1 - 2\sin^2\frac{\delta i}{2}\sin^2 2\theta\right) \\ Ai\sin^2\frac{\delta i}{2}\sin 4\theta \\ Ai\sin\delta i\sin 2\theta \end{pmatrix} \quad (5)$$

As a result, the polarization state of the light (I_output) emitted from the unit region 15 can be represented as Expression (6).

[Mathematical expression 8]

$$\text{I\_output} = \begin{pmatrix} \sum_{i=1}^{m} S_0(i) \\ \sum_{i=1}^{m} S_1(i) \\ \sum_{i=1}^{m} S_2(i) \\ \sum_{i=1}^{m} S_3(i) \end{pmatrix} = \begin{pmatrix} 1 \\ \sum_{i=1}^{m} Ai\left(1 - 2\sin^2\frac{\delta i}{2}\sin^2 2\theta\right) \\ \sum_{i=1}^{m} Ai\sin^2\frac{\delta i}{2}\sin 4\theta \\ \sum_{i=1}^{m} Ai\sin\delta i\sin 2\theta \end{pmatrix} \quad (6)$$

As conditions in which the light emitted from the unit region 15 represented by Expression (6) is depolarized and becomes a completely natural light, the respective Stokes parameters of Expression (6) should only satisfy Expression (7a), Expression (7b) and Expression (7c) described below.

[Mathematical expression 9]

$$\sum_{i=1}^{m} Ai\left(1 - 2\sin^2\frac{\delta i}{2}\sin^2 2\theta\right) = 0 \quad (7a)$$

$$\sum_{i=1}^{m} Ai\sin^2\frac{\delta i}{2}\sin 4\theta = 0 \quad (7b)$$

$$\sum_{i=1}^{m} Ai\sin\delta i\sin 2\theta = 0 \quad (7c)$$

Furthermore, in the case that Expression (7a), Expression (7b) and Expression (7c) described above are satisfied, it is preferable that the light emitted from the unit region 15 can be regarded as completely natural light. However, in the case that the left sides of Expression (7a), Expression (7b) and Expression (7c) are nearly zero, sufficient depolarization is obtained. The conditions described below should only be satisfied so that the left sides become nearly zero.

First, for the purpose of examining the polarization state of the light emitted from the unit region 15, a system is conceived in which an analyzer for allowing only the linearly-polarized light in a specific direction to pass through 100% is disposed in parallel with the X-Y plane behind the depolarization element 10. At this time, in the case that the transmission axis of the analyzer is disposed, for example, at an angle of φ with reference to the X direction in the X-Y plane, the amount of the light passing through the analyzer can be represented by Expression (8).

[Mathematical expression 10]

$$\frac{1}{2}\left(1 + \sum_{i=1}^{m} S_1(i)\cos 2\phi + \sum_{i=1}^{m} S_2(i)\sin 2\phi\right) \quad (8)$$

Even in the case that the direction of the transmission axis of the analyzer is changed, that is, φ is changed, in the state of depolarization, that is, when Expression (7a) and Expression (7b) are satisfied, the value of Expression (8) always becomes 0.5 regardless of the value of φ. On the other hand, in the case that Expression (7a) and Expression (7b) are not satisfied, the value of Expression (8) is dependent on the value of φ and has a value in the range described below.

[Mathematical expression 11]

$$\frac{1}{2}\left(1 - \sqrt{\left(\sum_{i=1}^{m} S_1(i)\right)^2 + \left(\sum_{i=1}^{m} S_2(i)\right)^2}\right) \sim$$

$$\frac{1}{2}\left(1 + \sqrt{\left(\sum_{i=1}^{m} S_1(i)\right)^2 + \left(\sum_{i=1}^{m} S_2(i)\right)^2}\right)$$

In Expression (8), a level at which polarization is sufficiently eliminated is in a range from 0.45 to 0.55. The conditions in which the light emitted from the unit region 15 represented by Expression (6) is in this range are given by Expression (9a) and Expression (9b).

[Mathematical expression 12]

$$\left|\sum_{i=1}^{m} Ai\left(1 - 2\sin^2\frac{\delta i}{2}\sin^2 2\theta\right)\right| \leq 0.0707 \quad (9a)$$

$$\left|\sum_{i=1}^{m} Ai\sin^2\frac{\delta i}{2}\sin 4\theta\right| \leq 0.0707 \quad (9b)$$

Furthermore, for the purpose of examining the polarization state of the light emitted from the unit region 15, a system is conceived in which a quarter wave length plate is disposed in parallel with the X-Y plane behind the depolarization element 10 and an analyzer for allowing only the linearly-polarized light in a specific direction to pass through is disposed in parallel with the X-Y plane therebehind. At this time, in the case that the transmission axis of the analyzer is disposed, for example, at an angle of φ with reference to the X direction in the X-Y plane, the amount of the light passing through the analyzer can be represented by Expression (10).

[Mathematical expression 13]

$$\frac{1}{2}\left(1 - \sum_{i=1}^{m} S_3(i)\cos 2\phi + \sum_{i=1}^{m} S_2(i)\sin 2\phi\right) \quad (10)$$

Even in the case that the direction of the transmission axis of the analyzer is changed, that is, φ is changed, in the state of depolarization, that is, when Expression (7b) and Expression (7c) are satisfied, the value of Expression (10) always becomes 0.5 regardless of the value of φ. On the other hand, in the case that Expression (7b) and Expression (7c) are not satisfied, the value of Expression (10) is dependent on the value of φ and has a value in the range described below.

[Mathematical expression 14]

$$\frac{1}{2}\left(1 - \sqrt{\left(\sum_{i=1}^{m} S_1(i)\right)^2 + \left(\sum_{i=1}^{m} S_2(i)\right)^2}\right) \sim \frac{1}{2}\left(1 + \sqrt{\left(\sum_{i=1}^{m} S_1(i)\right)^2 + \left(\sum_{i=1}^{m} S_2(i)\right)^2}\right)$$

In Expression (10), a level at which polarization is sufficiently eliminated is in a range from 0.45 to 0.55. The conditions in which the light emitted from the unit region 15 represented by Expression (6) is in this range are given by Expression (9b) and Expression (9c). Expression (9b) is the same as Expression (9b) described before.
[Mathematical Expression 15]

[Mathematical expression 15]

$$\left|\sum_{i=1}^{m} Ai \sin^2 \frac{\delta i}{2} \sin 4\theta\right| \leq 0.0707 \quad (9b)$$

$$\left|\sum_{i=1}^{m} Ai \sin \delta i \sin 2\theta\right| \leq 0.0707 \quad (9c)$$

As described above, for the purpose of obtaining sufficient depolarization, Expression (9a), Expression (9b) and Expression (9c) should only be satisfied. In the depolarization element 10 according to the present invention, Expression (9a), Expression (9b) and Expression (9c) can be satisfied for light beams having at least two different wavelengths by adjusting the area Ai of the i-th region of the unit region 15 and the phase difference δi generated in the i-th region. Moreover, for light beams having three or more different wavelengths or having wavelengths in specific wavelength bands, it is further preferable if the area Ai of the i-th region of the unit region 15 and the phase difference δi generated in the i-th region can be set so that Expression (9a), Expression (9b) and Expression (9c) are satisfied.

In the case that the depolarization element according to the present invention eliminates polarization for light beams having different wavelengths, a relationship is established between the wavelength and the phase difference δi generated in the i-th region. The phase difference δi generated in the i-th region is represented by Expression (11) using the refractive index anisotropy Δn of the birefringence material layer, the thickness di of the birefringence material layer of the i-th region and the wavelength λ. Herein, the phase difference δi is represented by δi(λ) as a function of the wavelength λ. Since wavelength dispersion is generally present in the refractive index anisotropy Δn, the refractive index anisotropy is represented by Δn(λ) as a function of the wavelength λ.

[Mathematical expression 16]

$$\delta i(\lambda) = \frac{360°}{\lambda} \Delta n(\lambda) \times di \quad (11)$$

More specifically, setting the phase difference δi generated in the i-th region of the unit region 15 for light beams having different wavelengths so that Expression (9a), Expression (9b) and Expression (9c) are satisfied is selecting a birefringence material having the wavelength dispersion Δn(λ) of the desired refractive index anisotropy and setting the depth di thereof.

Furthermore, it may be possible that the phase difference generated in the i-th region of the unit region 15 is δi, that k is an integer from 1 to (m−1), that the difference between the phase difference generated in the k-th region and the phase difference generated in the (k+1)th region is a constant value δ, that i is an integer from 1 to m, and that the limitation represented by Expression (12) is added.
[Mathematical expression 17]

$$\delta i = (m-i)\delta \quad (12)$$

With this limitation, the thicknesses of the birefringence material layers of the respective regions inside the unit region 15 can be set stepwise while having a constant level difference, and this is convenient, for example, in the etching process in production in some cases. Furthermore, Expression (12) represents that the phase difference generated in the m-th region is zero and that the thickness of the birefringence material layer of the m-th region is zero. In other words, this means that no birefringence material layer is formed in the m-th region. In this case, the thicknesses of the respective above-mentioned m regions should only be different while having a nearly equal level difference. The nearly equal level difference herein means that each level difference based on the average level difference of (m−1) level differences should only be in a range of −20% to +20%, a range of −10% to +10% is further preferable, and a range of −5% to +5% is still further preferable.

Next, a case is explained in which the angle θ between the polarization direction of the incident linearly-polarized light and the fast axis direction of the birefringence material layer of the depolarization element 10 (or the unit region 15) is 45°. In this case, the polarization state of the light (Ii_output) emitted from the i-th region is represented by Expression (13), and the polarization state of the light (I_output) emitted from the unit region 15 is represented by Expression (14).

[Mathematical expression 18]

$$Ii\_output = \begin{pmatrix} S_0(i) \\ S_1(i) \\ S_2(i) \\ S_3(i) \end{pmatrix} = \begin{pmatrix} Ai \\ Ai\cos\delta_i \\ 0 \\ Ai\sin\delta_i \end{pmatrix} \quad (13)$$

[Mathematical expression 19]

$$I\_output = \begin{pmatrix} \sum_{i=1}^{m} S_0(i) \\ \sum_{i=1}^{m} S_1(i) \\ \sum_{i=1}^{m} S_2(i) \\ \sum_{i=1}^{m} S_3(i) \end{pmatrix} = \begin{pmatrix} 1 \\ \sum_{i=1}^{m} Ai\cos\delta i \\ 0 \\ \sum_{i=1}^{m} Ai\sin\delta i \end{pmatrix} \quad (14)$$

As conditions that must be satisfied so that the light emitted from the unit region 15 represented by Expression (14) is depolarized and becomes completely natural light, Expression (15a) and Expression (15b) described below should only be satisfied with respect to the respective Stokes parameters of Expression (14).

[Mathematical expression 20]

$$\sum_{i=1}^{m} Ai\cos\delta i = 0 \quad (15a)$$

$$\sum_{i=1}^{m} Ai\sin\delta i = 0 \quad (15b)$$

Furthermore, in the case that Expression (15a) and Expression (15b) described above are satisfied, it is preferable that the light emitted from the unit region 15 can be regarded as completely natural light. However, in the case that the values obtained on the left sides of Expression (15a) and Expression (15b) are nearly zero, sufficient depolarization is obtained. The conditions described below should only be satisfied so that the values become nearly zero.

For the purpose of examining the polarization state of the light emitted from the unit region 15, a system is conceived in which an analyzer for allowing only the linearly-polarized light in a specific direction to pass through 100% is disposed in parallel with the X-Y plane behind the depolarization element 10. At this time, in the case that the transmission axis of the analyzer is disposed, for example, at an angle of φ with reference to the X direction in the X-Y plane, the amount of the light passing through the analyzer can be represented by Expression (16).

[Mathematical expression 21]

$$\frac{1}{2}\left(1 + \sum_{i=1}^{m} S_1(i)\cos 2\phi\right) \quad (16)$$

Even in the case that the direction of the transmission axis of the analyzer is changed, that is, φ is changed, in the state of depolarization, that is, when Expression (15a) is satisfied, the value of Expression (16) always becomes 0.5 regardless of the value of φ. On the other hand, in the case that Expression (15a) is not satisfied, the value of Expression (16) is dependent on the value of φ and has a value in the range described below.

[Mathematical expression 22]

$$\frac{1}{2}\left(1 - \sum_{i=1}^{m} S_1(i)\right) \sim \frac{1}{2}\left(1 + \sum_{i=1}^{m} S_1(i)\right)$$

In Expression (16), a level at which polarization is sufficiently eliminated is in a range from 0.45 to 0.55. The condition in which the light emitted from the unit region 15 represented by Expression (14) is in this range is given by Expression (17a).

[Mathematical expression 23]

$$\left|\sum_{i=1}^{m} Ai\cos\delta i\right| \le 0.1 \quad (17a)$$

Furthermore, for the purpose of examining the polarization state of the light emitted from the unit region 15, a system is conceived in which a quarter wave length plate is disposed in parallel with the X-Y plane behind the depolarization element 10 and an analyzer for allowing only the linearly-polarized light in a specific direction to pass through 100% is disposed in parallel with the X-Y plane therebehind. At this time, in the case that the transmission axis of the analyzer is disposed, for example, at an angle of φ with reference to the X direction in the X-Y plane, the amount of the light passing through the analyzer can be represented by Expression (18).

[Mathematical expression 24]

$$\frac{1}{2}\left(1 - \sum_{i=1}^{m} S_3(i)\cos 2\phi\right) \quad (18)$$

Even in the case that the direction of the transmission axis of the analyzer is changed, that is, φ is changed, in the state of depolarization, that is, when Expression (15b) is satisfied, the value of Expression (18) always becomes 0.5 regardless of the value of φ. On the other hand, in the case that Expression (15b) is not satisfied, the value of Expression (18) is dependent on the value of φ and has a value in the range described below.

[Mathematical expression 25]

$$\frac{1}{2}\left(1 - \sum_{i=1}^{m} S_3(i)\right) \sim \frac{1}{2}\left(1 + \sum_{i=1}^{m} S_3(i)\right)$$

In Expression (18), a level at which polarization is sufficiently eliminated is in a range from 0.45 to 0.55. The condition in which the light emitted from the unit region 15 represented by Expression (14) is in this range is given by Expression (17b).

[Mathematical expression 26]

$$\left|\sum_{i=1}^{m} Ai\sin\delta i\right| \le 0.1 \quad (17b)$$

As described above, for the purpose of obtaining sufficient depolarization, Expression (15a) and Expression (15b) should only be satisfied. In the depolarization element 10 according to the present invention, Expression (15a) and Expression (15b) can be satisfied for light beams having at least two different wavelengths by adjusting the area Ai of the i-th region of the unit region 15 and the phase difference δi generated in the i-th region. Moreover, for light beams having three or more different wavelengths or having wavelengths in specific wavelength bands, it is further preferable if the area Ai of the i-th region of the unit region 15 and the phase difference δi generated in the i-th region can be set so that Expression (15a) and Expression (15b) are satisfied.

Furthermore, when the angle θ between the polarization direction of the incident linearly-polarized light and the fast axis direction of the birefringence material layer of the depolarization element 10 (or the unit region 15) is limited to 45°, this is advantageous in the following respects in some cases. In other words, in the case that the angle θ is 45°, Expression (17a) and Expression (17b), used as conditions in which the depolarization element 10 obtains sufficient depolarization, should only be satisfied. On the other hand, in the case that the angle θ is not 45°, this case is preferable since simplification and value relaxation can be attained in some cases in comparison with the case in which Expression (9a), Expression (9b) and Expression (9c) are satisfied. The angle θ should only be approximately 45°. At this time, approximately 45° should only be in the range of 35° to 55°, preferably in the range of 40° to 50°, and further preferably in the range of 43° to 47°.

As described above using the Stokes parameters, in the depolarization element 10 of the present invention, sufficient depolarization is obtained for light beams having at least two different wavelengths by adjusting the area Ai of the i-th region and the phase difference δi generated in the i-th region in the unit region 15 constituting the depolarization element 10. Furthermore, even in the case that light beams in a wide band are incident, a depolarization element having high depolarization can be obtained.

Next, as in the depolarization element 10, a case is considered specifically in which the unit region 15 consists of the first region 11, the second region 12, the third region 13 and the fourth region 14. The birefringence material constituting the birefringence material layer is assumed to be a material having the wavelength dispersion of the refractive index anisotropy Δn based on Expression (19) described below wherein α=0.03, β=0.0015 and γ=0. In addition, the wavelengths of incident light beams are assumed to be $\lambda_1$=440 nm, $\lambda_2$=532 nm and $\lambda_3$=650 nm, and the polarization for the light beams having these three kinds of wavelengths will be examined. The unit of λ in Expression (19) is μm.

[Mathematical expression 27]

$$\Delta n(\lambda) = \alpha + \frac{\beta}{\lambda^2} + \frac{\gamma}{\lambda^1} \tag{19}$$

The area of the unit region 15 is standardized as 1, and the area Ai of the i-th region is set respectively to A1=0.15, A2=0.36, A3=0.35 and A4=0.14. Furthermore, it is assumed that the thickness of the birefringence material layer of the first region 11 is 22.0 μm, that the thickness of the birefringence material layer of the second region 12 is 14.7 μm, that the thickness of the birefringence material layer of the third region 13 is 7.3 μm, and that the fourth region 14 has no birefringence material layer. In addition, it is assumed that the angle θ between the polarization direction of the incident linearly-polarized light and the fast axis direction of the birefringence material layer of the depolarization element 10 is 45°.

When it is herein assumed that the phase difference $\delta_i(\lambda)$ generated in the i-th region is given by Expression (11) and that $\lambda=\lambda_1$=440 nm in Expression (19), the phase difference of the i-th region is obtained: δ1(440)=679°, the phase difference δ2(440)=453°, the phase difference δ3(440)=226°, the phase difference δ4(440)=0°. At this time, when the polarization state of the light emitted from the depolarization element 10 is represented by the Stokes parameters of Expression (14), (1, −0.006, 0, 0.008) is obtained, each satisfying Expression (17a) and Expression (17b).

Furthermore, when it is assumed that $\lambda=\lambda_2$=532 nm in Expression (19), the phase difference of the i-th region is obtained: δ1(532)=526°, the phase difference δ2(532)=350°, the phase difference δ3(532)=175°, the phase difference δ4(532)=0°. At this time, similarly, when the polarization state of the light emitted from the depolarization element 10 is represented by the Stokes parameters of Expression (14), (1, 0.001, 0, 0.007) is obtained, each satisfying Expression (17a) and Expression (17b).

Moreover, when it is assumed that $\lambda=\lambda_3$=650 nm in Expression (19), the phase difference of the i-th region is obtained: δ1(650)=409°, the phase difference δ2(650)=273°, the phase difference δ3 (650)=136°, the phase difference δ4(650)=0°. At this time, similarly, when the polarization state of the light emitted from the depolarization element 10 is represented by the Stokes parameters of Expression (14), (1, 0.018, 0, −0.005) is obtained, each satisfying Expression (17a) and Expression (17b).

The depolarization of the depolarization element 10 can be evaluated by confirming that the values represented by Expression (16) and Expression (18) are in the range of 0.45 to 0.55, and it is possible to say that the depolarization is higher as the respective values are closer to 0.5. Furthermore, the light being established while the values represented by Expression (16) and Expression (18) are in the range of 0.45 to 0.55 should only have a wide band, preferably in the wavelength range of 440 nm to 760 nm, and further preferably in the wavelength range of 400 nm to 700 nm.

(Projection Type Display Device According to Embodiment)

Figure 10A:
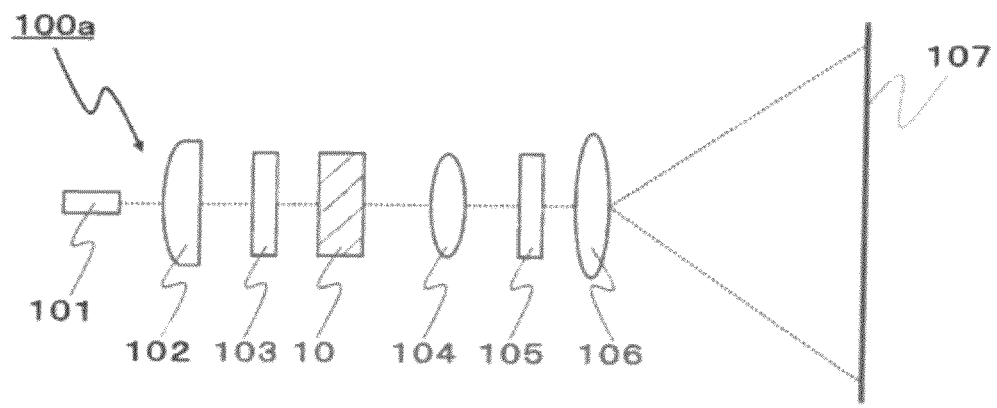
FIG. 10A is a schematic view showing a configuration of a projection type display device.
Figure 10B:
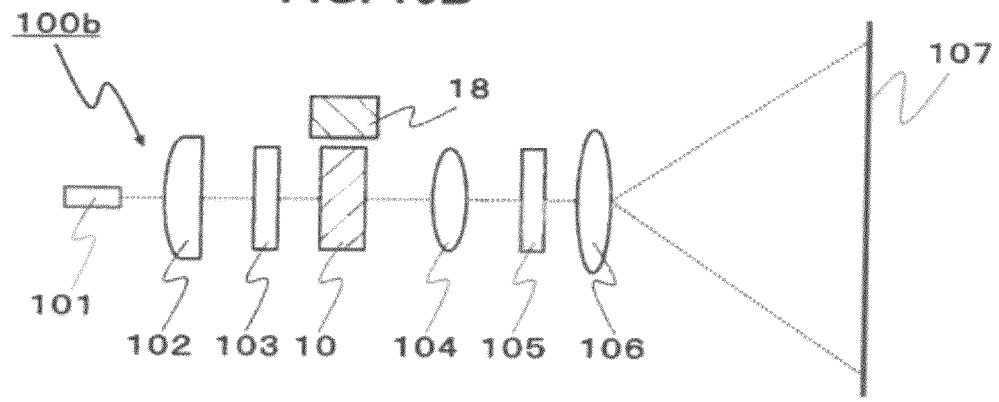
FIG. 10B is a schematic view showing a configuration of a projection type display device having a rocking control section.

FIGS. 10A and 10B are schematic views showing configurations of projection type display devices according to an embodiment of the present invention. The light emitted from at least one laser 101, such as a semiconductor laser or a solid-state laser, serving as a light source section for emitting coherent light and used as a light-emitting means is condensed by a collimator lens 102 so as to become nearly parallel light and passes through a polarizer 103. The semiconductor laser serving as the laser 101, for example, emits linearly-polarized light. However, the polarization direction of the light is variable and changes with respect to time in some cases due to variations in production, usage environment, temperature change, etc. The polarizer 103 is used to make the polarization state of the light constant, but can be omitted. The light having passed the polarizer 103 is averaged in spatial light coherence by allowing light beams being different in polarization state to transmit through the depolarization element 10 and then emitted. The scattered light having been transmitted through the depolarization element 10 is condensed by a focusing lens 104 on a spatial light modulator 105 serving as an image light generating section. Furthermore, the light emitted from the laser 101 may be light that is scattered by being guided through fiber or the like. In this case, projection type display devices 100a and 100b may have the configurations shown in FIGS. 10A and 10B, but may also have configurations not including the collimator lens 102 and the polarizer 103.

The light having passed through the depolarization element 10 passes through the focusing lens 104, and the light is then homogenized and irradiated to the spatial light modulator 105. For example, when a condenser lens having a large numerical aperture is used as the focusing lens 104, light can be taken in efficiently and light use efficiency can be raised. As the spatial light modulator 105, a transmissive liquid crystal panel can be used typically. However, it may be possible to use a reflective liquid crystal panel, a digital micromirror device (DMD), etc. When the transmissive liquid crystal panel or the reflective liquid crystal panel is used, a polarization converting device may be disposed between the depolarization element 10 and the spatial light modulator 105 to raise the light use efficiency. In other words, the polarization state can be made uniform by allowing light transmission through this polarization converting device. Hence, for example, when light is transmitted through or reflected by an optical device having polarization dependability, light use efficiency can be raised.

The light beam incident on the spatial light modulator 105 as described above is modulated depending on an image signal and is projected on a screen 107 or the like by a projection lens 106. The light source may have a configuration in which only one laser light source is used, a configuration in which plural laser light sources for emitting light beams having different wavelengths are disposed or a configuration in which a light source having no coherence and a laser light source are combined. Furthermore, the depolarization element 10 may be disposed in the optical path between the spatial light modulator 105 and the projection lens 106 or in the optical path between the projection lens 106 and the screen 107.

In addition, the projection type display device 100b shown in FIG. 10B is equipped with a rocking control section for rocking the depolarization element 10. In other respects, the configuration of the projection type display device 100a is the same as that of the projection type display device 100a shown in FIG. 10A. More specifically, the rocking control section 18 should only be capable of rocking the depolarization element 10 in a specific direction at a constant time period and has a mechanical mechanism, such as a motor, a spring, a piezoelectric element or an actuator that uses an electromagnetic force. The direction in which the depolarization element 10 is rocked may be a direction in which the depolarization element 10 is oscillated repeatedly in a one-dimensional direction inside a plane perpendicular to the optical axis, a direction in which the depolarization element 10 is oscillated around the optical axis, or a direction in which the depolarization element 10 is oscillated in a circular motion inside a plane perpendicular to the optical axis. Furthermore, the rocking control section 18 may be equipped with a mechanism for oscillating the depolarization element 10 in the direction of the optical axis or oscillating the depolarization element 10 three-dimensionally. Moreover, the oscillating period is preferably 30 Hz or more at which the human eye cannot follow, and further preferably 50 Hz or more. The polarization state of the light to be transmitted is changed not only spatially but also in time by performing oscillation control using the rocking control section 18, whereby speckle noise can be reduced significantly.

EXAMPLE

Figure 11:
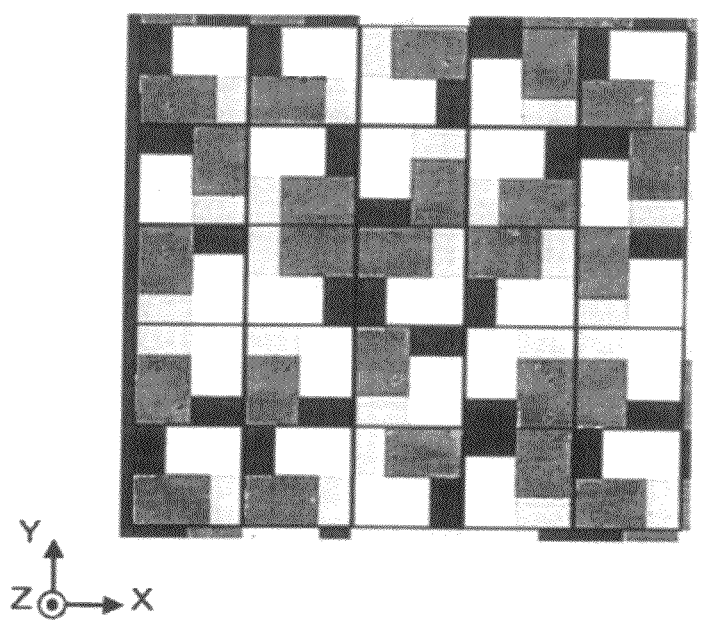
FIG. 11 is a plan view showing a depolarization element according to an example.

As an example, as shown in FIG. 3, the plural unit regions 20, each formed of four regions that are randomly laid out, were formed into a pattern as the depolarization element 10 according to the first embodiment. More specifically, FIG. 11 is a magnified photographic plan view showing the produced depolarization element. The thick lines in FIG. 11 are boundary lines for clearly indicating the unit regions and added to an actual photographic plan view. The unit region has a square shape measuring 0.4 mm by 0.4 mm.

Next, a method for producing the depolarization element 10 according to this example will be described below referring to FIGS. 9A and 9B. A quartz glass substrate was used as the substrate 16a, an antireflection film, not shown, for preventing the reflection of visible light was formed on one face of the substrate, a polyimide film, not shown, was applied to the opposite-side face of the substrate, and rubbing treatment was performed at 45° from the X direction of the coordinate system in the figure to form an alignment film. Then, a film of polymer liquid crystal was formed on the alignment film so as to have a thickness of 14 μm. The polymer liquid crystal used is characterized in that the coefficients of wavelength dispersion are $\alpha=0.03$, $\beta=0.0015$ and $\gamma=0$.

Next, the polymer liquid crystals of the third region 13 and the fourth region 14 were eliminated by performing photolithography and etching processes while the polymer liquid crystal corresponding to the birefringence material layer 31a of the first region 11 and the polymer liquid crystal corresponding to the birefringence material layer 32 of the second region 12 were maintained. When the area of the unit region 20 was assumed to be 100%, the area of the first region 11 was 15%, and the area of the second region 12 was 36%.

Next, a quartz glass substrate was used as the substrate 16b, an antireflection film, not shown, for preventing the reflection of visible light was formed on one face of the substrate, a polyimide film, not shown, was applied to the opposite-side face of the substrate, and rubbing treatment was performed at 45° from the X direction of the coordinate system in the figure to form an alignment film. Then, a film of polymer liquid crystal was formed on the alignment film so as to have a thickness of 7 μm. The polymer liquid crystal used is characterized in that the coefficients of wavelength dispersion are $\alpha=0.03$, $\beta=0.0015$ and $\gamma=0$ in Expression (19).

Next, the polymer liquid crystals of the second region 12 and the fourth region 14 were eliminated by performing photolithography and etching processes while the polymer liquid crystal corresponding to the birefringence material layer 31b of the first region 11 and the polymer liquid crystal corresponding to the birefringence material layer 33 of the third region 13 were maintained. When the area of the unit region 20 was assumed to be 100%, the area of the first region 11 was 15%, and the area of the third region 12 was 35%. Then, the substrate 16a and the substrate 16b were disposed so that the polymer liquid crystals were opposed to each other and then integrated with an isotropic adhesive held therebetween to form the depolarization element 10. At this time, lamination was performed so that the alignment directions of the respective alignment films were corresponded.

Figure 12:
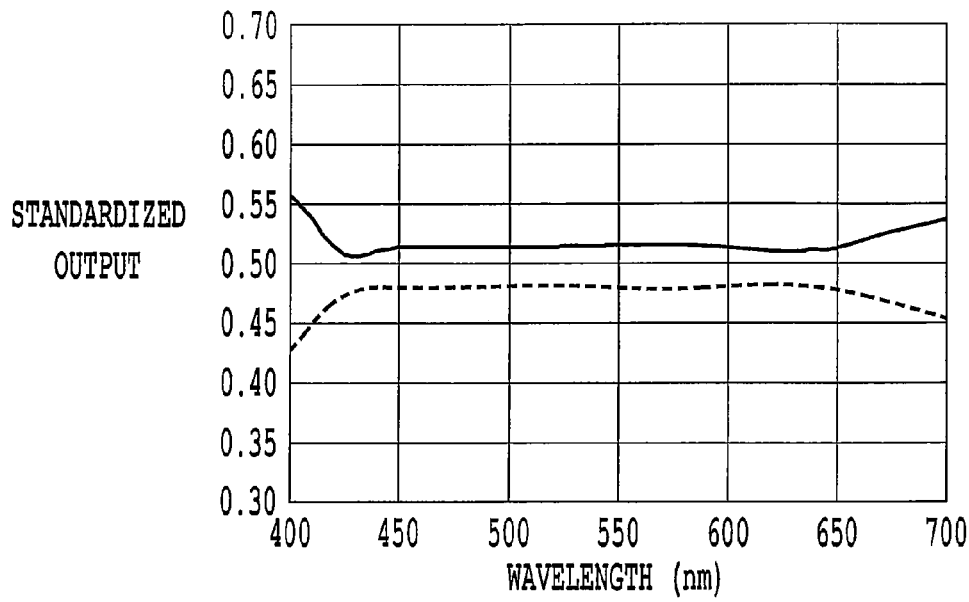
FIG. 12 is a view showing a depolarization characteristic (1) with respect to the wavelength of incident light in the example.

The values corresponding to the left sides of Expression (15a) and Expression (15b) and the value corresponding to Expression (16) were measured to evaluate the depolarization of the produced depolarization element 10 at the time when the linearly-polarized light in the Y direction advancing in the Z direction inside the X-Y plane is incident on the depolarization element 10. The diameter of the light incident on the depolarization element 10 was 2 mm and the wavelength thereof was in the range of 400 to 700 nm. FIG. 12 shows the result obtained as the maximum and minimum output values at the time when the analyzer for evaluating the value corresponding to the left side of Expression (15a) was rotated in the range of −90° to 90° at 15° intervals, wherein the solid line indicates the maximum values of the output and the broken line indicates the minimum values of the output. As shown in FIG. 12, as the result of the measurement, the solid line indicating the maximum values and the broken line indicating the minimum values are located between 0.45 and 0.55 in the wavelength range of 420 to 700 nm including the wavelengths of 440 nm, 532 nm and 650 nm.

Figure 13:
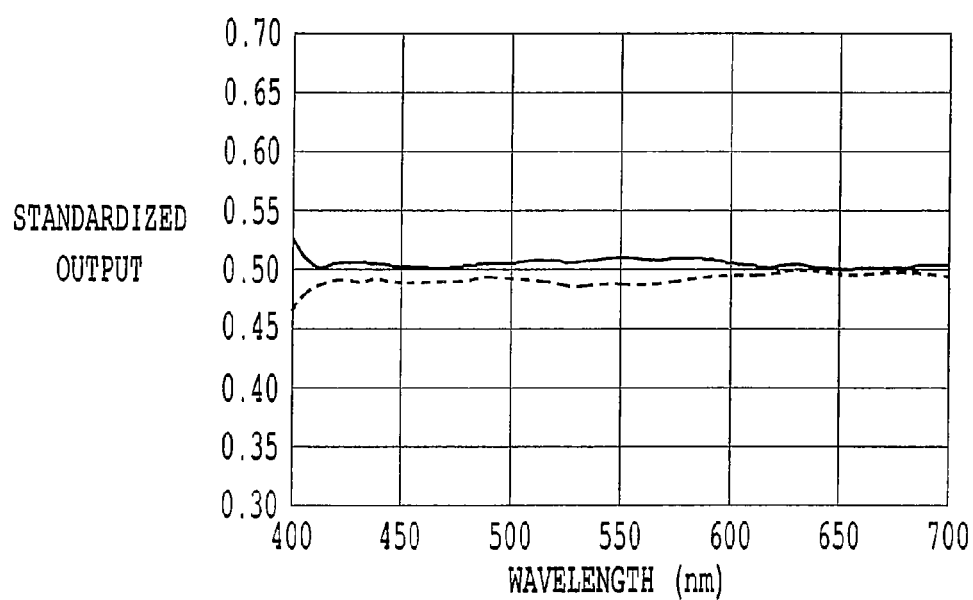
FIG. 13 is a view showing a depolarization characteristic (2) with respect to the wavelength of incident light in the example.

FIG. 13 shows the result obtained as the maximum and minimum output values at the time when the analyzer for evaluating the value corresponding to the left side of Expression (15b) was rotated in the range of −90° to 90° at 15° intervals, wherein the solid line indicates the maximum values of the output and the broken line indicates the minimum values of the output. As shown in FIG. 13, as the result of the measurement, the solid line indicating the maximum values and the broken line indicating the minimum values are located between 0.45 and 0.55 in the wavelength range of 400 to 700 nm including the wavelengths of 440 nm, 532 nm and 650 nm. Since the values corresponding to Expression (15a), Expression (15b) and Expression (16) are located between 0.45 and 0.55, that is, since the values have levels in which polarization is assumed to be sufficiently eliminated, it is possible to confirm that the depolarization element 10 has sufficient depolarization in a wide band.

COMPARATIVE EXAMPLE

Figure 14:
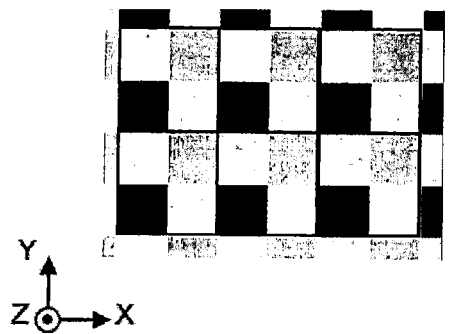
FIG. 14 is a plan view showing a depolarization element according to a comparative example.

As a comparative example, a depolarization element having unit regions each formed of four regions having an equal area was produced, and the depolarization of the depolarization element was evaluated. More specifically, FIG. 14 is a magnified photographic plan view showing the produced depolarization element. The thick lines in FIG. 14 are boundary lines for clearly indicating the unit regions and added to an actual photographic plan view. The unit region has a square shape measuring 1.0 mm by 1.0 mm, and each of the four reasons constituting the unit region has a square shape measuring 0.5 mm by 0.5 mm.

The depolarization element according to the comparative example was produced by using materials and methods similar to those for the depolarization element 10 according to the example, except for the following points. When it was assumed that the four regions constituting the unit region shown in FIG. 14 were a first region, a second region, a third region and a fourth region in the order of upper left, upper right, lower left and lower right, a polymer liquid crystal layer having a thickness of 7.5 μm was formed only in the first region and the second region of one of the quartz glass substrates. Furthermore, a polymer liquid crystal layer having a thickness of 3.8 μm was formed only in the first region and the third region of the other quartz glass substrate. The substrates were disposed so that the polymer liquid crystal layers were opposed to each other and then integrated with an isotropic adhesive held therebetween. The thicknesses of the polymer liquid crystal layers, etc. of the produced depolarization element were designed so that high depolarization was obtained for the light having a wavelength of 532 nm.

Figure 15:
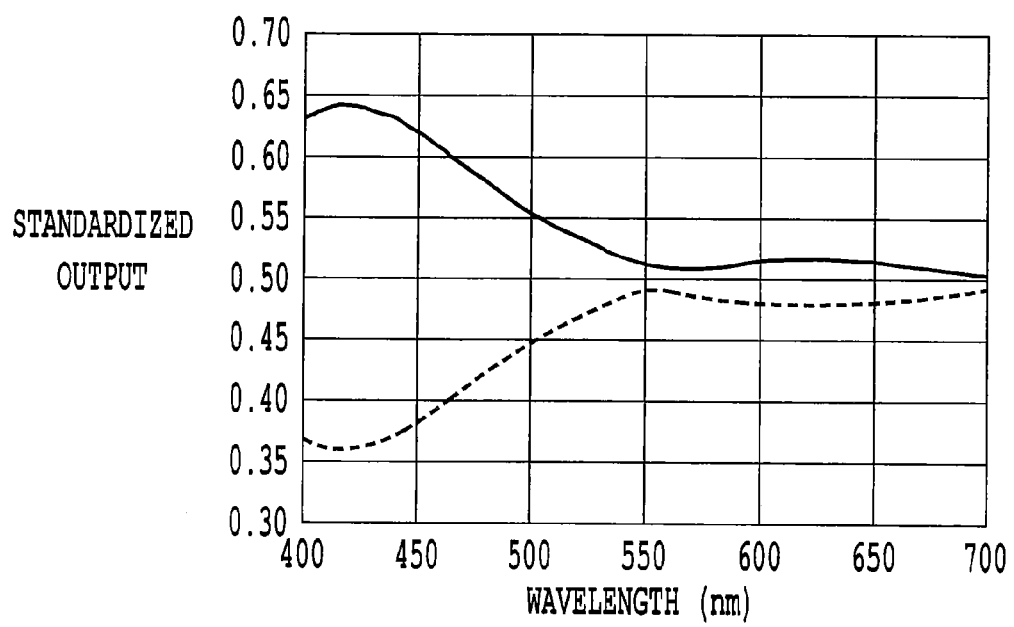
FIG. 15 is a view showing a depolarization characteristic (1) with respect to the wavelength of incident light in the comparative example.

The values corresponding to the left sides of Expression (15a) and Expression (15b) and the value corresponding to Expression (16) were measured to evaluate the depolarization of the produced depolarization element at the time when the linearly-polarized light in the Y direction advancing in the Z direction inside the X-Y plane is incident on the depolarization element. The wavelength of the incident light was in the range of 400 to 700 nm. FIG. 15 shows the result obtained as the maximum and minimum output values at the time when the analyzer for evaluating the value corresponding to the left side of Expression (15a) was rotated in the range of −90° to 90° at 15° intervals, wherein the solid line indicates the maximum values of the output and the broken line indicates the minimum values of the output. As shown in FIG. 15, as the result of the measurement, the solid line indicating the maximum values and the broken line indicating the minimum values are located between 0.45 and 0.55 in the wavelength range of 510 to 700 nm including the wavelength of 532 nm. On the other hand, the maximum values are 0.55 or more and the minimum values are 0.45 or less in the wavelength range of 400 to 510 nm.

Figure 16:
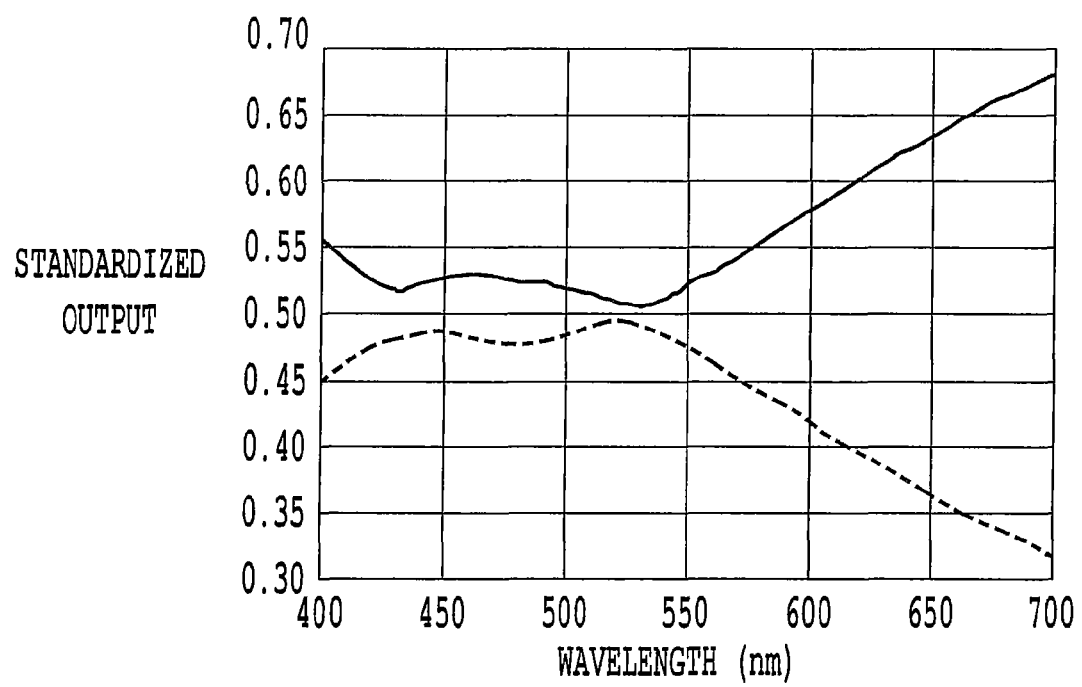
FIG. 16 is a view showing a depolarization characteristic (2) with respect to the wavelength of incident light in the comparative example.

FIG. 16 shows the result obtained as the maximum and minimum output values at the time when the analyzer for evaluating the value corresponding to the left side of Expression (15b) was rotated in the range of −90° to 90° at 15° intervals, wherein the solid line indicates the maximum values of the output and the broken line indicates the minimum values of the output. As shown in FIG. 16, as the result of the measurement, the solid line indicating the maximum values and the broken line indicating the minimum values are located between 0.45 and 0.55 in the wavelength range of 410 to 570 nm including the wavelength of 532 nm. On the other hand, the maximum values are 0.55 or more and the minimum values are 0.45 or less in the wavelength range of 570 to 700 nm.

Hence, in the wavelength range of 410 to 570 nm, the values corresponding to Expression (15a), Expression (15b) and Expression (16) are located between 0.45 and 0.55, that is, the values have levels in which polarization is assumed to be sufficiently eliminated. Consequently, high depolarization in a high band is not obtained.

As described above, the present invention can provide a depolarization element capable of obtaining uniformly high depolarization for plural light beams having coherence and different wavelengths. In addition, the present invention has an effect capable of reducing speckle noise generated on the entire area of a projection image stably and significantly in a projection type display device employing a light source for emitting plural light beams having coherence and different wavelengths.

What is claimed is:

1. A depolarization element comprising:
   birefringence material layers including birefringence materials; and
   unit regions, each formed of m regions (m≥4) having different phase differences generated for incident linearly-polarized light, wherein:
   two regions, extracted from the m regions, has at least one combination of regions being different in area;
   a polarization state of the light that includes two or more light beams being different is changed; and
   when the area of the unit region is 1, i is an integer of 1 to m, the area of the i-th region is Ai, the phase difference generated for the light incident on the i-th region is δi, the angle between the polarization direction of the incident linearly-polarized light and the optical axis of the birefringence material is θ, the following expressions are satisfied

[Mathematical expression 28]

$$\left| \sum_{i=1}^{m} Ai\left(1 - 2\sin^2\frac{\delta i}{2}\sin^2 2\theta\right) \right| \leq 0.0707 \quad (9a)$$

$$\left| \sum_{i=1}^{m} Ai\sin^2\frac{\delta i}{2}\sin 4\theta \right| \leq 0.0707 \quad (9b)$$

$$\left| \sum_{i=1}^{m} Ai\sin\delta i\sin 2\theta \right| \leq 0.0707. \quad (9c)$$

2. The depolarization element according to claim 1, wherein the m is fallen within a range from 4 to 8.

3. The depolarization element according to claim 1, wherein
   the light includes a light beam having a wavelength of 440 nm and a light beam having a wavelength of 650 nm.

4. The depolarization element according to claim 3, wherein
   the light includes a light beam having a wavelength of 532 nm.

5. The depolarization element according to claim 4, wherein
   the light includes a light beam having a band of 440 to 650 nm.

6. The depolarization element according to claim 1, wherein:
  the optical axes of the birefringence materials are aligned in the same direction; and
  the thicknesses of the birefringence material layers of the m regions are different from each other (a layer having a thickness of zero is included).

7. The depolarization element according to claim 6, wherein
  the thicknesses of the m regions are different from each other while having a nearly equal level difference.

8. The depolarization element according to claim 1, wherein
  the angle between the polarization direction of the linearly-polarized light and the optical axis direction of the birefringence material is approximately 45° and the following expressions are satisfied

[Mathematical expression 29]

$$\left| \sum_{i=1}^{m} A_i \cos\delta_i \right| \leq 0.1 \tag{17a}$$

$$\left| \sum_{i=1}^{m} A_i \sin\delta_i \right| \leq 0.1. \tag{17b}$$

9. A projection type display device comprising:
  a light source section having at least one light source emitting coherent light;
  an image light generating section for generating image light by modulating the light emitted from the light source section;
  a projection section for projecting the image light; and
  a depolarization element, disposed in the optical path of the light emitted from the light source section, including:
    birefringence material layers including birefringence materials; and
    unit regions, each formed of m regions (m≥4) having different phase differences generated for incident linearly-polarized light, wherein:
  two regions, extracted from the m regions, has at least one combination of regions being different in area;
  a polarization state of the light that includes two or more light beams being different is changed; and
  when the area of the unit region is 1, i is an integer of 1 to m, the area of the i-th region is $A_i$, the phase difference generated for the light incident on the i-th region is $\delta_i$, the angle between the polarization direction of the incident linearly-polarized light and the optical axis of the birefringence material is $\theta$, the following expressions are satisfied

[Mathematical expression 30]

$$\left| \sum_{i=1}^{m} A_i \left(1 - 2\sin^2\frac{\delta_i}{2}\sin^2 2\theta\right) \right| \leq 0.0707 \tag{9a}$$

$$\left| \sum_{i=1}^{m} A_i \sin^2\frac{\delta_i}{2}\sin 4\theta \right| \leq 0.0707 \tag{9b}$$

$$\left| \sum_{i=1}^{m} A_i \sin\delta_i \sin 2\theta \right| \leq 0.0707. \tag{9c}$$

10. The projection type display device according to claim 9, further comprising:
  a rocking control section for oscillating the disposed depolarization element.

* * * * *